United States Patent [19]

Pierce

[11] Patent Number: 4,615,539
[45] Date of Patent: Oct. 7, 1986

[54] SUSPENSION FOR AUTOMOTIVE VEHICLES

[75] Inventor: William C. Pierce, Muskegon, Mich.

[73] Assignee: Lear Siegler, Inc., Santa Monica, Calif.

[21] Appl. No.: 698,607

[22] Filed: Feb. 6, 1985

[51] Int. Cl.[4] .......................... B60G 3/14; B60G 11/26
[52] U.S. Cl. .................................... 280/690; 280/713; 180/905
[58] Field of Search ...................... 280/705, 80 R, 690, 280/711, 713; 180/905, 88

[56] References Cited

U.S. PATENT DOCUMENTS

| | | | |
|---|---|---|---|
| 3,332,701 | 7/1964 | Masser | 280/713 |
| 3,502,348 | 3/1970 | Bellamy | 280/80 R |
| 3,801,086 | 4/1974 | Raidel | 280/713 |
| 4,261,597 | 4/1981 | Vandenberg | 280/711 |
| 4,371,190 | 2/1983 | Vandenberg | 280/705 |

*Primary Examiner*—John J. Love
*Assistant Examiner*—Karin L. Ferriter
*Attorney, Agent, or Firm*—Varnum, Riddering, Schmidt & Howlett

[57] ABSTRACT

In a vehicle with a frame and ground-engaging wheels suspended therefrom by a suspension having, on each side of the vehicle, a bracket rigidly secured to the frame; a trailing arm pivotably mounted to the bracket and having two sets of openings, each set aligned transversely of the trailing arm; an air spring rigidly connected to and between the frame and the trailing arm; and a bushing extending between each set of aligned openings and positioned within the trailing arm. An axle is rigidly connected to each trailing arm by an axle bracket. Each axle bracket comprises a wrapper rigidly secured to the axle; two plates rigidly secured to the wrapper, each plate having two apertures aligned with the two sets of openings; a shock mounting bracket rigidly secured to one of the plates; and four gussets rigidly secured to and between the plates and the wrapper to add rigidity to the axle bracket to aid in withstanding torsional and lateral forces exerted thereon incidental to the operation of the vehicle. At least one of the four gussets is curved to resiliently yield in response to torsional forces between the wrapper and the connecting plate to which it is attached. Each axle bracket is secured to each trailing arm by two pins, each pin extends through each aligned set of apertures and openings and a bushing. A shock absorber is connected to and between each of the shock mounting brackets and the frame.

24 Claims, 5 Drawing Figures

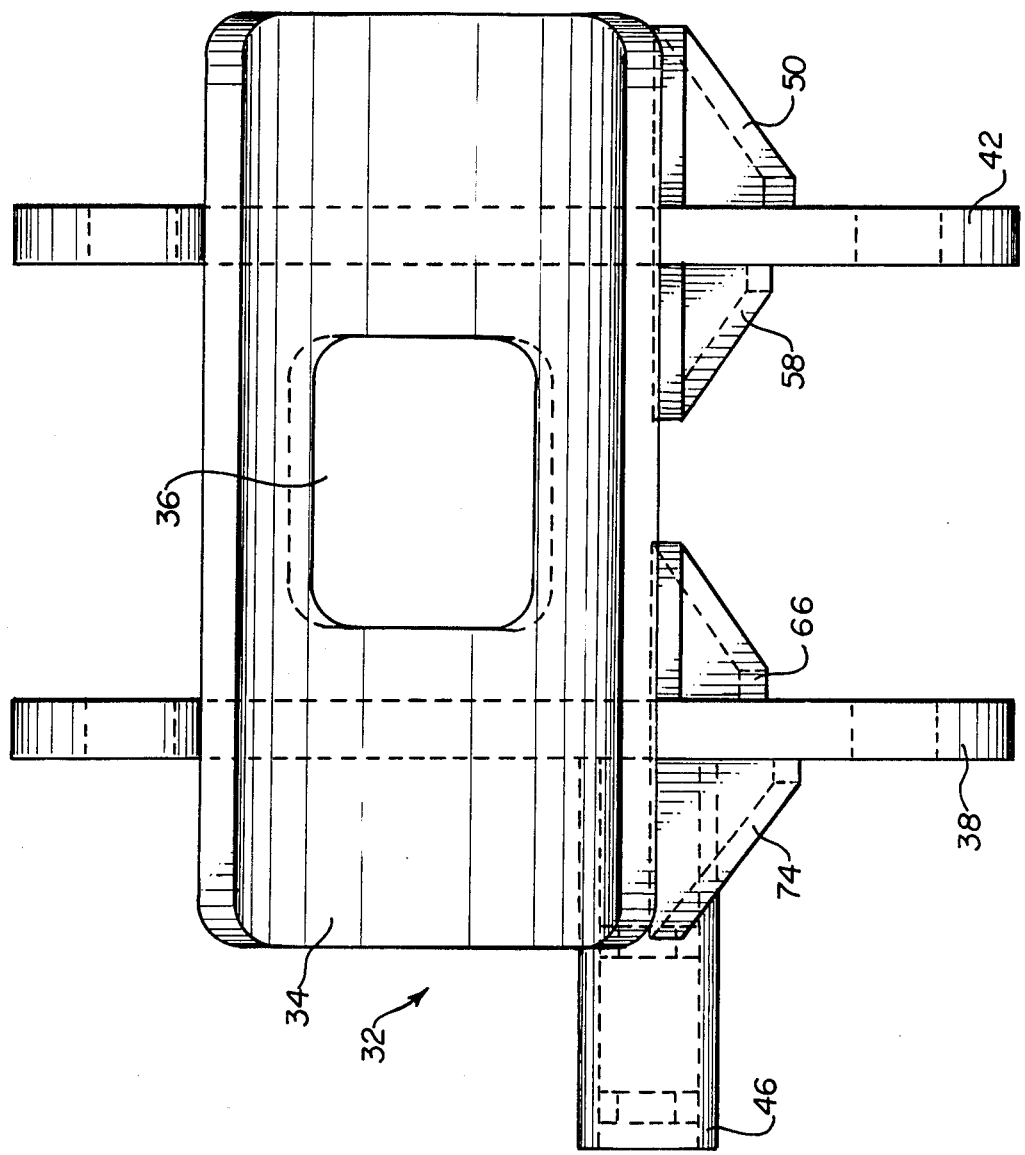
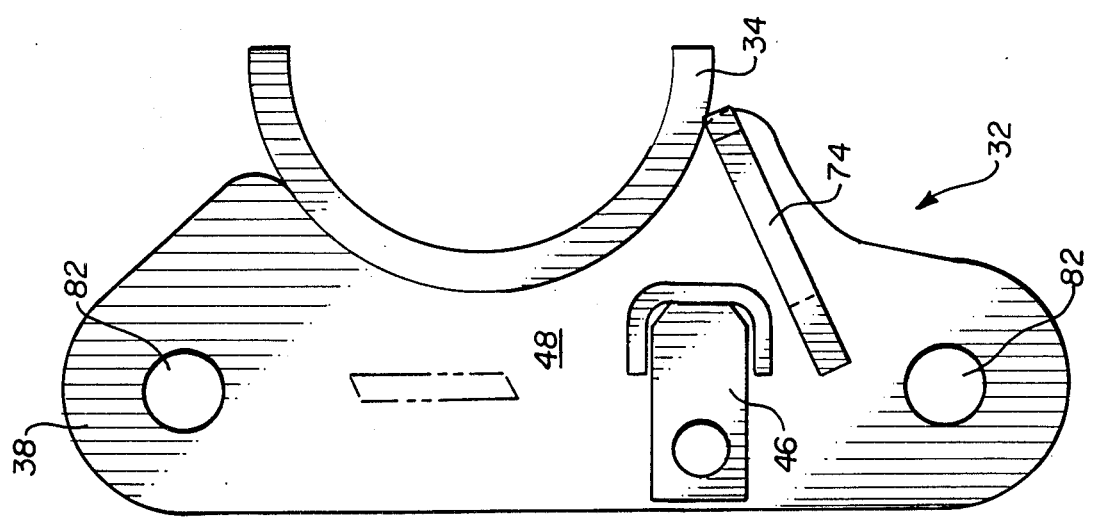
FIG. 4
FIG. 3

SUSPENSION FOR AUTOMOTIVE VEHICLES

FIELD OF THE INVENTION

The present invention relates to vehicle suspension systems and is especially adapted for the use of air springs suspensions in commercial vehicles.

DESCRIPTION OF THE PRIOR ART

Vehicle suspensions having an arm pivotably mounted to a vehicle frame typically have an air spring mounted between a free end of the arm and the frame and an axle mounted to the top of the arm. An example of one such suspension is disclosed and claimed in the Masser U.S. Pat. No. 3,332,701, issued July 25, 1967. In the Masser patent, the axle is positioned on two bracket plates which cradle the axle. The brackets are rigidly secured to the axle by welding and are secured to the trailing arm by a bushed two-pin connection. It is also known to attach a flat plate between the bracket plates and weld the axle to the flat plate.

In VanDenberg, U.S. Pat. No. 4,371,190, issued Feb. 1, 1983, a similar suspension is shown wherein a saddle plate extends between the spaced bracket plates and welds are provided between the saddle plates and the axle. Further, the axle is clamped to the saddle plates through V-bolts which are bolted to a beam housing beneath the beam or arm. The VanDenberg, U.S. Pat. No. 4,261,597 issued Apr. 14, 1981, shows a similar structure and discloses that the welds can extend between the side plates and the axle as well. These suspensions are relatively heavy and bulky due to the many brackets, plates, beam housings and U-bolt assemblies.

It is also known to attach axles to arms through axle clamping plates and rubber pads which wrap around the axle. The axle clamping plates are clamped around the rubber pads and axle with bolts.

The trailing arms and the plates are subject to severe shear or lateral forces. In addition, the weld connection between the plates and axle is subject to severe torsional and shear forces as well as drive or braking torque incidental to the operation of the vehicle.

SUMMARY OF THE INVENTION

According to the invention, there is provided a simple, lightweight, relatively inexpensive suspension structure for a vehicle having a frame and wheel-bearing axle. The suspension is the type wherein at least two substantially rigid arms are secured to opposite sides of the frame through substantially aligned pivot mounts and a spring is preferably interposed in load-transmitting relation between the arms and the frame. At least one wheel-carrying axle extends between the arms and a bracket means secures the at least one axle to each of the arms.

According to the invention, the bracket means comprises an axle plate means rigidly secured to the axle and having an elongated planar complementary surface at least partially wrapping around the axle. Two spaced connecting plates are secured transversely to the axle plate means and to one of the arms. Bracing means are rigidly secured in angular relationship to the axle plate means and the connecting plates to enhance torsional and shear resistance of the axle plate means and the connecting plates assembly.

Preferably, the bracing means comprises at least two gussets, each positioned at an acute angle to the axle plate means and to one of the connecting plates. At least one of the gussets is preferably curved to resiliently yield in response to torsional and shear forces exerted on the axle plate means and the respective one of the connecting plates to which it is attached. In one embodiment, at least one of the gussets is flat to rigidly resist torsional movement of the axle plate means with respect to the connecting plates. Thus, the gussets can comprise any combination of curved and flat gussets.

Typically, the gussets are triangularly shaped, have a first side edge which is welded to the axle plate means and a second side edge welded to a respective one of the connecting plates. Desirably, at least two of the gussets are sufficiently large to rigidify the connecting plates.

By adding rigidity to the axle brackets, the gussets enable the axle brackets to better withstand torsional and lateral forces exerted thereon incidental to the operation of the vehicle. However, on each axle bracket, at least one of the gussets, that gusset on which the greatest load is exerted, is curved, thereby enabling such gusset to distribute the forces exerted thereon over the adjacent area of the axle bracket.

The axle plate means preferably has an enlarged hole extending through a central portion thereof to increase the torsional flexibility of the axle plate means. In one embodiment, the hole is substantially rectangular in shape and a portion of the arm is positioned within the hole. The plate can be a partial cylinder to mount on a round beam or can be a partial prism to mount on a rectangular beam. In any case, the axle plate means extends at least 90° and preferably about 150° around the axle.

Typically, a shock absorber is securely mounted between one of the connecting plates and the vehicle frame on each side of the vehicle. Preferably, the shock absorber is pivotably mounted to one of the connecting plates by a shock mounting bracket.

In a preferred embodiment of the invention, the connecting plates are secured to the arm through at least two bushed connections. To this end, each of the arms has at least two sets of transversely aligned openings and at least one elastomeric bushing extending between each set of aligned openings and positioned within the arm. Each of the connecting plates has at least one pair of apertures aligned with the two sets of openings and each of the bracket means is secured to one of the arms by a plurality of pins. Each of the pins extends through at least one of the elastomeric bushings and aligned set of apertures and openings.

Further, according to the invention, the pins and the pivotable mounts are coated with zinc phosphate to resist oxidation of the bushing-and-pin combination and the pivot mount.

BRIEF DESCRIPTION OF THE DRAWINGS

The invention will now be described with reference to the drawings in which:

FIG. 3 is a side elevational view illustrating the axle bracket of the suspension shown in FIGS. 1 and 2;

FIG. 4 is a plan view of the axle bracket shown in FIG. 3; and

DESCRIPTION OF THE PREFERRED EMBODIMENTS

Figure 1:
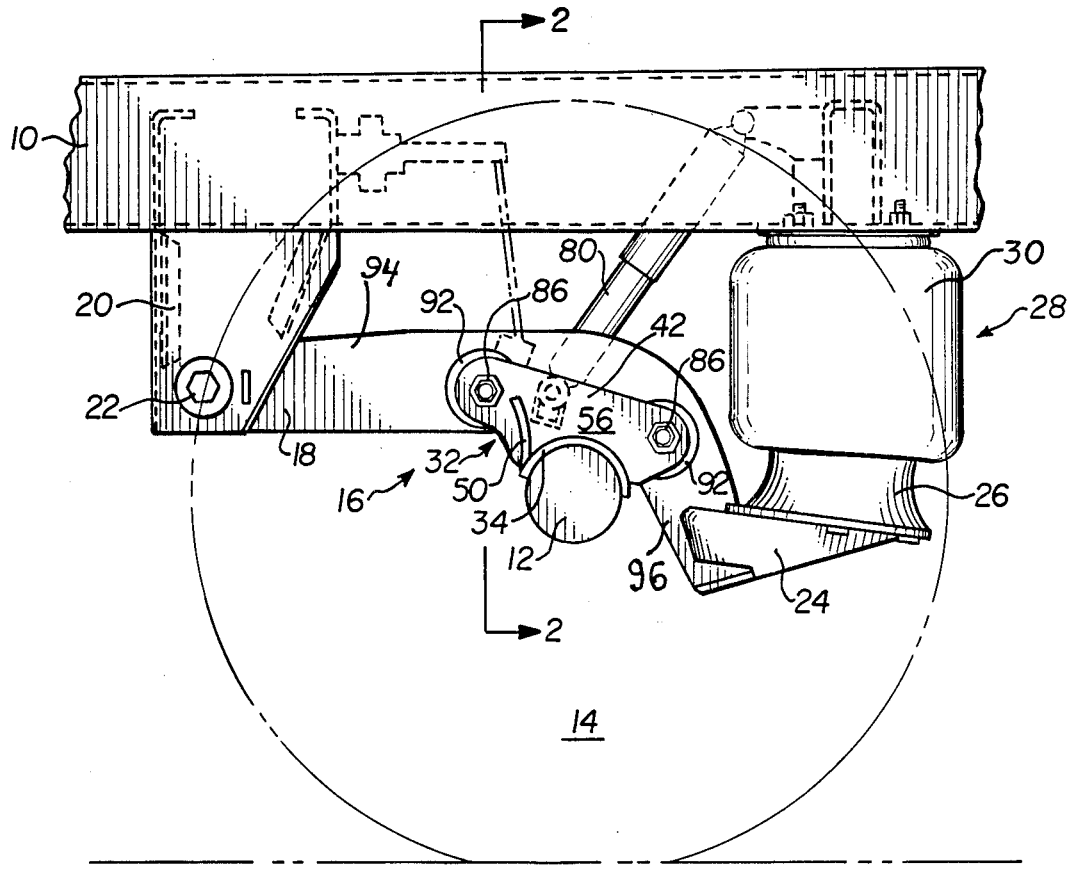
FIG. 1 is a fragmentary, side elevational view of a vehicle frame having mounted thereon a suspension system according to the invention.
Figure 2:
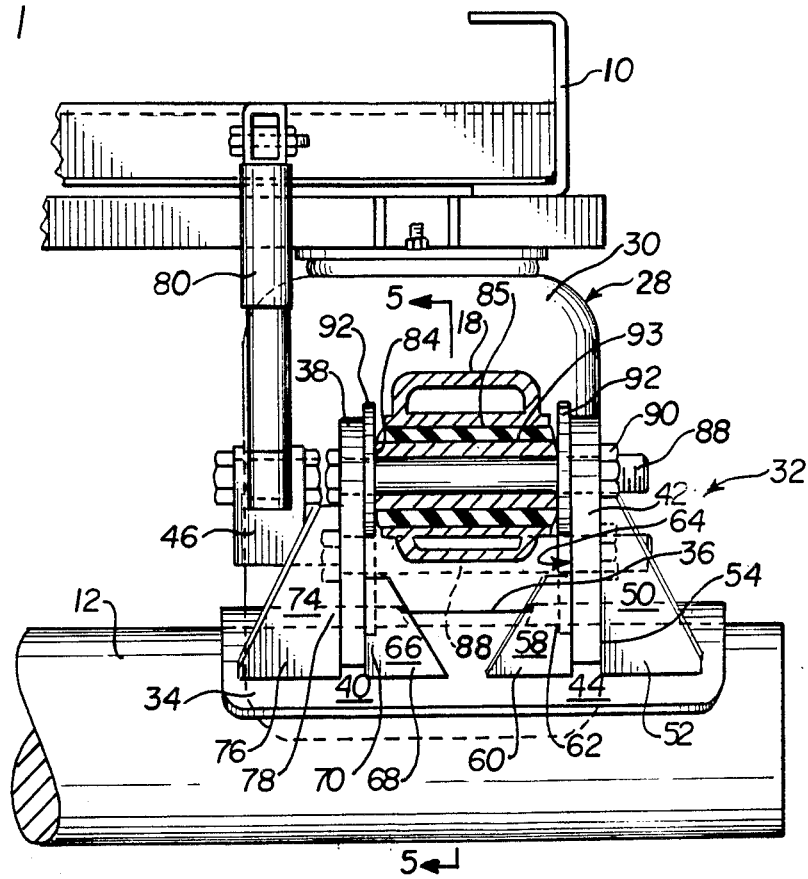
FIG. 2 is an enlarged, fragmentary, sectional view taken along lines 2—2 of FIG. 1.
Figure 5:
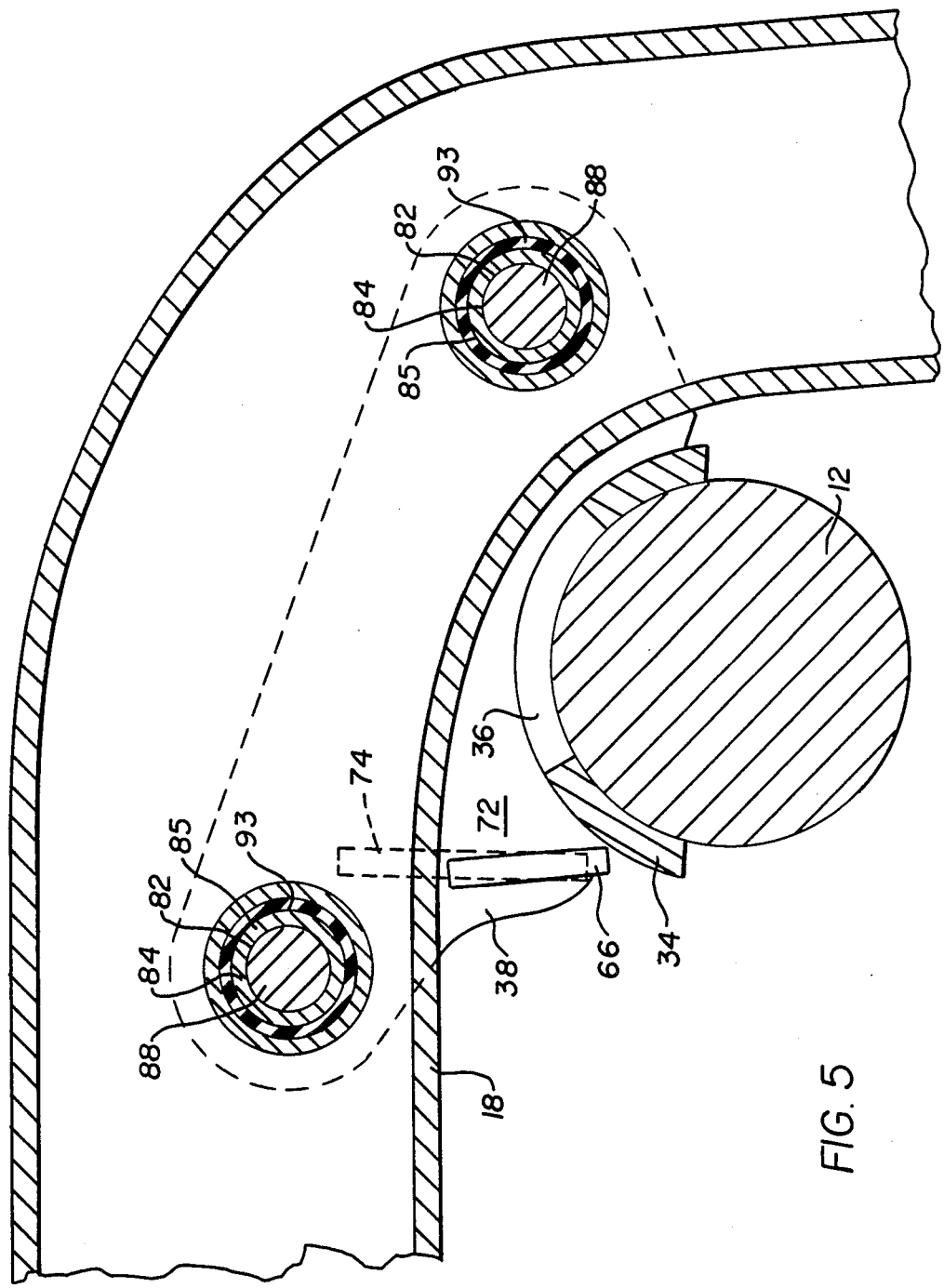
FIG. 5 is a sectional view taken along lines 5—5 of FIG. 2.

Referring to the drawings and to FIG. 1 in particular a vehicle frame 10 has an axle 12 and ground engaging wheels 14 suspended therefrom by a suspension 16 according to the invention. The front of the vehicle is to the left side of the frame as viewed in FIG. 1. Suspension 16 includes, at each side of vehicle frame 10, a trailing arm 18 pivotally mounted to a frame bracket 20 depending from frame 10 at pivotal mount 22. Each trailing arm extends rearwardly of the vehicle and away from its pivotal mount in a direction which is longitudinal of vehicle frame 10 and each trailing arm has a portion 24 which is secured to a pedestal 26 of an air spring 28; a top mounting plate 30 of air spring 28 being secured to vehicle frame 10.

Axle 12 is rigidly connected to each trailing arm 18 by an axle bracket 32 straddling trailing arm 18. Each axle bracket comprises a semicylindrical wrapper plate 34 rigidly secured to axle 12 and having a rectangular hole 36. An inside plate 38 is securely attached to the inside part 40 of wrapper plate 34. An outside plate 42 is securely attached to the outside part 44 of wrapper plate 34. A shock-mounting bracket 46 is securely attached to the inner face 48 of inside plate 38. A first triangular gusset plate 50 is attached at a horizontal leg 52 to outside part 44 of wrapper plate 34 and at a vertical leg 54 to the outside face 56 of outside plate 42. A second triangular gusset plate 58 is attached at a horizontal leg 60 to outside part 44 of wrapper plate 34 and at a vertical leg 62 to inside face 64 of outside plate 42. A third triangular gusset plate 66 is attached at a horizontal leg 68 to the inside part 40 of wrapper plate 34 and at a vertical leg 70 to the outer face 72 of inside plate 38. A fourth triangular gusset plate 74 is attached at its horizontal leg 76 to inside part 40 of wrapper plate 34 and at its vertical leg 78 to inner face 48 of inside plate 38. All of the foregoing elements of axle bracket 32 are attached by welding along adjoining surfaces. In addition, whereas second gusset plate 58, third gusset plate 66 and fourth gusset plate 74 are flat plates, first gusset plate 50 is a curved plate.

A telescoping shock absorber 80 is connected between shock mounting bracket 46 and frame 10 to control rebound of the air spring and to limit downward swinging of the trailing arm to protect the air spring from pulling apart.

Inside plate 38 and outside plate 42 each has a pair of apertures 82 aligned with 2 sets of openings 84 in trailing arm 18. Each set of openings 84 is aligned transversely of the trailing arm. Extending transversely between each set of aligned openings in trailing arm 18 is a bushing 85 of the type described in U.S. Pat. No. 3,332,701. If it is desired, two bushings, rather than one, can extend end to end transversely between each set of aligned openings.

A pin 86 extends through each set of aligned apertures 82 and openings 84, and through at least one bushing to securely connect trailing arm 18 to axle 12. Each pin comprises a bolt 88, a nut 90 threadably engaging bolt 88, and two spacer washers 92, one sandwiched between inside face 64 of outside plate 42 and trailing arm 18, the other sandwiched between outer face 72 of inside plate 38 and trailing arm 18.

Wrapper plate 34 is preferably designed with hole 36. Hole 36 provides clearance for trailing arm 18, reduces the weight of axle bracket 32 and gives axle bracket 32 flexibility during assembly. Although, in assembled configuration, the trailing arms 18 neither interfere with wrapper plates 34 nor rest within holes 36, holes 36 do provide clearance for trailing arms 18 in the event that the elastomeric linings 93 of the bushings 85 wear. Over the useful life of the bushings, the elastomeric linings 93 thereof wear due to torsional and lateral forces exerted thereon. As the bushings wear, the trailing arms 18 settle and rest closer to wrapper plates 34. Holes 36 provide clearance for trailing arms 18 in the event of such settling.

Due to manufacturing tolerances, the apertures 82 in the inside and outside plates 38 and 42, respectively, of the axle bracket 32 are typically out of alignment with the two sets of aligned openings 84 in the trailing arm 18. Alignment of the openings with the apertures requires the wrapper plate to be somewhat flexible. This flexibility is provided, in part, by the hole 36. Welding of the wrapper plate 34 to the axle 12 increases the rigidity of the wrapper plate and thus reduces the flexibility required for alignment. In view of the above, to align the two sets of openings with the apertures, during assembly, the axle bracket 32 is first secured to the trailing arm 18. Subsequent to alignment, the axle 12 is secured to the wrapper plate 34.

In vehicle suspension systems it is desirable to provide for adequate vertical axle movement relative to the vehicle frame and a trailing arm that is cost efficient yet rigid enough to withstand the stresses exerted thereon during vehicle operation. To achieve these goals, the present invention employs a relatively long air spring 28, compared to that disclosed in U.S. Pat. No. 3,332,701, and a trailing arm 18 having a horizontal part 94 and a downwardly depending part 96, in contrast to the straight trailing arm disclosed in the above-stated patent. It is understood, however, that a substantially straight trailing arm can also be used. The curved design of trailing arm 18 provides for sufficient space between the same and vehicle frame 10 to accommodate air spring 28 and position air spring 28 close to axle 12. By positioning air spring 28 close to axle 12, a shorter and more cost-efficient trailing arm can be used; a shorter trailing arm does not require the incorporation of structural reinforcements which might otherwise be necessary in a longer trailing arm.

To accommodate the trailing arm design, the plane defined by the two-pin connection between axle 12 and trailing arm 18 is pitched from the horizontal plane. In addition, the front pin 86 is connected to the horizontal part 94 of trailing arm 18 and the rear pin 86 is connected to the downwardly-depending part 96 of trailing arm 18. This design obviates the need to employ a trailing arm that curves substantially at a right angle, a trailing arm that requires the incorporation of costly reinforcements.

A two-pin connection is provided between axle bracket 32 and trailing arm 18. The two pins 86 extend generally parallel to axle 12 and are spaced apart to provide a broad base for support against lateral forces exerted on control arms 18 and against drive or brake torque on axle 12. In the present invention, the two-pin connection can be either asymmetrical or symmetrical about the center of axle 12. In the asymmetrical design, which is shown in the drawings, the distance between the center of axle 12 and the rear pin 86 is less than the distance between the center of axle 12 and the front pin 86. In the symmetrical design (not shown), the distances between the center of the axle 12 and the rear and forward pins 86 are equal.

There are a variety of forces exerted on suspension 16 during normal operation of the vehicle. All forces on suspension 16, with the exception of the forces controlled by air springs 28 and shock absorbers 80, are controlled by the suspension members themselves. These forces include shear and lateral forces exerted on the trailing arms 18 and the axle bracket 32 by the pins 86. In addition, the weld connection between the wrapper plate 34 and axle 12 is subject to severe torsional and shear forces as well as drive or braking torque incidental to the operation of the vehicle.

The gusset plates 50, 58, 66 and 74 are an important feature of the invention. The gusset plates add rigidity to axle bracket 32 and thereby enhance the torsional and shear strength of the axle bracket 32. A significant load is ordinarily exerted on the weld connection between axle 12 and axle bracket 32 during normal operation of the suspension. This connection is braced substantially by first gusset 50. As seen in FIG. 1, first gusset 50 is curved. The curved design of first gusset 50 more evenly distributes the shear and torsional forces exerted on the axle bracket 32 and the weld connection between axle 12 and axle bracket 32 by slightly flexing or resiliently resisting higher loading on the suspension.

In a given suspension, it may be desirable to provide less rigid support against forces exerted on axle bracket 32 and the connection between axle bracket 32 and axle 12. In such case, second gusset plate 58, third gusset plate 66, fourth gusset plate 74 or any combination thereof can be curved in a manner similar to first gusset plate 50. If more rigid support is desired, all the gusset plates can be made substantially flat.

To resist oxidation of the metal lining of the bushings 85 and pins 86 in contact therewith, these elements can be coated with zinc phosphate, a substance found to resist rust. In addition, pivotal mounts 22 can be coated with zinc phosphate.

While it is contemplated that suspension 16 of this invention will have its greatest use with air springs, other types of springs such as coil springs or rubber springs can be used instead of air springs.

Axle 12 can be either a driven axle, for example on a tractor, or a dead axle, for example on a trailer. Suspension 16 can be mounted in single axle arrangement on a vehicle or in multiple-axle tandem arrangements.

Axle 12 can be mounted either above trailing arms 18 or in an underslung position by merely orienting the axle brackets 32 right side up or upside down before securing them to control arms 18 by pins 86.

Whereas the invention has been described with reference to a trailing arm suspension with an axle mounted thereto, the invention is equally applicable to a walking-beam type suspension wherein the beam is pivotally mounted at a central portion to a frame bracket and an axle is mounted to each end of the beam with a spring means between each end of the beam and the frame. Further, whereas the invention has been described with reference to a round axle, the invention is equally applicable to a square or rectangular axle. In such a case, the wrapper plate 34 is shaped in a complementary manner to snugly engage the axle along a portion of its length. The wrapper plate 34 extends at least 90° around the axle and preferably about 135°–180° around the axle.

While particular embodiments of the invention have been shown, it will be understood that the invention is not limited thereto since reasonable variations and modifications all possible within the skill of the art, particularly in light of the foregoing teachings, without departing from the spirit of the invention which is set forth in the appended claims.

The embodiments of the invention in which an exclusive property or privilege is claimed are defined as follows:

1. A vehicle suspension system for mounting ground-engaging wheels to a vehicle frame, the suspension system comprising at least two substantially rigid arms secured to opposite sides of the frame through substantially aligned pivot mounts; at least one wheel-carrying axle between said arms; and a bracket means securing said at least one axle to each of said arms; the improvement in each of said bracket means comprising:
    an axle plate means rigidly secured to said axle and having an elongated planar complementary surface at least partially wrapping around said axle;
    two spaced connecting plates secured transversely to said axle plate means and to one of said arms; and
    a bracing means comprising at least one curved gusset plate rigidly and angularly secured to and between said axle plate means and one of said connecting plates and structured to enhance torsional and shear resistance of said axle plate means and said connecting plates and to resiliently yield in response to torsional forces between said axle plate means and the one of said connecting plates to which it is attached.

2. A vehicle suspension according to claim 1 wherein said bracing means further comprises at least one flat gusset plate rigidly and angularly secured to and between said axle plate means and one of said connecting plates to rigidly resist torsional movement of said axle plate means with respect to said connecting plates.

3. A vehicle suspension according to claim 2 wherein there are at least three of said flat gusset plates.

4. A vehicle suspension according to claim 2 where each of said curved and flat gusset plates is triangularly shaped, has a first side edge welded to said axle plate means and a second side edge welded to a respective one of said connecting plates.

5. A vehicle suspension system according to claim 4 wherein said axle plate means has an enlarged hole extending through a central portion thereof to increase the flexibility of said axle plate means.

6. A vehicle suspension system according to claim 5 wherein said enlarged hole is substantially rectangular in shape.

7. A vehicle suspension system according to claim 6 wherein said axle plate means extends at least 90° around said axle.

8. A vehicle suspension system according to claim 7 wherein said axle plate extends about 150° around said axle.

9. A vehicle suspension system according to claim 8 and further comprising, on each side of said suspension, a shock absorber adapted to be securely mounted to and between one of said connecting plates and said vehicle frame.

10. A vehicle suspension according to claim 7 wherein a shock absorber is pivotably mounted to one of said connecting plates by a shock mounting bracket.

11. A vehicle suspension system according to claim 10 wherein each of said arms has at least two sets of transversely aligned openings and at least one elastomeric bushing extending between each set of aligned openings and positioned within said arm; each of said connecting plates has at least one pair of apertures aligned with said two sets of bushings; each of said connecting plates is secured to one of said arms by a plurality of pins, each pin extending through at least one of said elastomeric bushings and aligned set of apertures and openings.

12. A vehicle suspension system according to claim 11 wherein said pins and pivotable mounts are coated with zinc phosphate to resist oxidation of said bushing-and-pin combination and said pivot mounts.

13. A vehicle having a frame, ground-engaging wheels an a suspension system according to claim 12 mounting said wheels to said vehicle frame.

14. A vehicle suspension according to claim 1 wherein there are at least four of said gusset plates.

15. A vehicle suspension according to claim 14 wherein each of said gusset plates is triangularly shaped, has a first side edge welded to said axle plate means and has a second side edge welded to a respective one of said connecting plates.

16. A vehicle suspension system according to claim 1 wherein each of said gusset plates is triangularly shaped, has a first side edge welded to said axle plate means and has a second side edge welded to a respective one of said connecting plates.

17. A vehicle suspension system according to claim 16 wherein said axle plate means has an enlarged hole extending through a central portion thereof to increase the flexibility of said axle plate means.

18. A vehicle suspension system according to claim 1 wherein said axle plate means has an enlarged hole extending through a central portion thereof to increase the flexibility of said axle plate means.

19. A vehicle suspension system according to claim 18 wherein said hole is substantially rectangular in shape.

20. A vehicle suspension system according to claim 1 wherein said axle plate extends at least 90° around said axle.

21. A vehicle suspension system according to claim 1 wherein said axle plate extends about 150° around said axle.

22. A vehicle suspension system according to claim 1 and further comprising, on each side of said suspension, a shock absorber adapted to be securely mounted to and between one of said connecting plates and said vehicle frame.

23. A vehicle suspension system according to claim 1 each of said arms has at least two sets of transversely aligned openings and at least one elastomeric bushing extending between each set of aligned openings and positioned within said arm; each of said connecting plates has at least one pair of apertures aligned with said two sets of openings; and each of said connecting plates is secured to one of said arms by a plurality of pins, each pin extending through at least one of said elastomeric bushings and aligned set of apertures and openings.

24. A vehicle having a frame, ground-engaging wheels a suspension system according to claim 1 mounting said wheels to said vehicle frame.

* * * * *